(12) United States Patent
Wang et al.

(10) Patent No.: US 12,441,640 B2
(45) Date of Patent: Oct. 14, 2025

(54) COMPOSITE TREATMENT AND REMEDIATION TECHNOLOGY FOR POLLUTED WATER AND SOIL

(71) Applicant: CHINESE RESEARCH ACADEMY OF ENVIRONMENTAL SCIENCES, Beijing (CN)

(72) Inventors: Lei Wang, Beijing (CN); Ming Chang, Beijing (CN); Haiqing Liao, Beijing (CN); Shungui Zhou, Beijing (CN); Shaofeng Li, Beijing (CN); Weining Xu, Beijing (CN); Xiaoshu Wang, Beijing (CN); Yangyang Wang, Beijing (CN); Yiwei Li, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 255 days.

(21) Appl. No.: 17/906,608

(22) PCT Filed: Aug. 6, 2021

(86) PCT No.: PCT/CN2021/111079
§ 371 (c)(1),
(2) Date: Sep. 16, 2022

(87) PCT Pub. No.: WO2022/088825
PCT Pub. Date: May 5, 2022

(65) Prior Publication Data
US 2023/0249998 A1    Aug. 10, 2023

(30) Foreign Application Priority Data
Oct. 30, 2020   (CN) .......................... 202011191731.0

(51) Int. Cl.
*C02F 3/10* (2023.01)
*B09C 1/06* (2006.01)
(Continued)

(52) U.S. Cl.
CPC .............. *C02F 3/106* (2013.01); *B09C 1/065* (2013.01); *B09C 1/08* (2013.01); *C02F 3/104* (2013.01);
(Continued)

(58) Field of Classification Search
None
See application file for complete search history.

(56) References Cited

U.S. PATENT DOCUMENTS 4,157,959 A * 6/1979 Wen .................... B01D 24/4668
                                                                    95/275
2003/0196960 A1* 10/2003 Hughes .............. B01D 39/2068
                                                                    210/681
(Continued)

FOREIGN PATENT DOCUMENTS

| CN | 106268635 A | * | 1/2017 | |
| CN | 106881350 A | * | 6/2017 | ............... B09C 1/10 |
| CN | 111732463 A | * | 10/2020 | |

OTHER PUBLICATIONS

Machine translation of CN106268635A (Year: 2025).*
Machine translation of CN106881350A (Year: 2025).*
Machine translation of CN111732463A (Year: 2025).*

*Primary Examiner* — Chester T Barry
(74) *Attorney, Agent, or Firm* — CBM PATENT CONSULTING, LLC

(57) ABSTRACT

The present invention relates to a composite treatment and recovery technique of polluted water body and soil. Iron-rich straw biomass, after being crushed, is mixed and granulated with sludge, and is pyrolytic charred by programmed heating, to obtain bulk loaded zero-valent iron (Continued)

biochar and sludge biochar composite particles, which are packed as fillers in a filled bed or as filters in filter cells of a fixed bed, for effective recovery of complex polluted water, polluted by heavy metals, organics, nitrogen, phosphorus, and the like.

13 Claims, 2 Drawing Sheets

(51) Int. Cl.
*B09C 1/08* (2006.01)
*C02F 3/00* (2023.01)
*C02F 101/10* (2006.01)
*C02F 101/16* (2006.01)
*C02F 101/20* (2006.01)

(52) U.S. Cl.
CPC .. *C02F 2003/003* (2013.01); *C02F 2101/105* (2013.01); *C02F 2101/16* (2013.01); *C02F 2101/20* (2013.01)

(56) References Cited

U.S. PATENT DOCUMENTS

| | | | |
|---|---|---|---|
| 2008/0096268 A1* | 4/2008 | Herner | B01D 53/85 435/266 |
| 2013/0168332 A1* | 7/2013 | Appling | A61M 1/3646 210/791 |

* cited by examiner

COMPOSITE TREATMENT AND REMEDIATION TECHNOLOGY FOR POLLUTED WATER AND SOIL

TECHNICAL FIELD

The present invention relates to the field of environmental recovery, in particular to a treatment and recovery technique of polluted water body and soil.

BACKGROUND ART

As agricultural and industrial production progresses, large amounts of industrial waste, domestic waste, sewage, etc., are constantly being discharged to the environment, causing pollution of water bodies and soil.

Especially water basins, the soil of which suffers contamination due to water pollution. In particular, water and soil pollution in water basins due to multiple pollution sources, such as heavy metals, organics, pesticides, and the like is increasingly common and its recovery issues are increasingly prominent.

Nanoscale zero-valent iron has been widely used as an efficient recovery material due to its large specific surface area and surface energy, which can induce special surface effects and quantum effects.

However, nanoscale zero-valent iron is extremely prone to oxidation in air to form a passivating layer, thus reducing the activity, and itself is prone to agglomeration, greatly reducing its specific surface area and reactivity, resulting in reduced reducing power, which greatly limits the application of nanoscale zero-valent iron.

To this end, researchers tend to improve the removal performance of nanoscale zero-valent iron for heavy metals by utilizing methods of biochar modification. Existing ways of modifying nano scale zero-valent iron with biochar are mainly by impregnating biomass to adsorb iron salts and the like, and then preparing the biochar nanoscale zero-valent iron nickel composite by processes, such as pyrolysis. Even it is further modified by nickel through nickel salts and the like. The obtained biochar nanoscale zero-valent iron nickel composite is a surface-supported composite, whose stability etc. is to be improved.

SUMMARY OF THE INVENTION

The present inventors have conducted research and found that: for iron-rich straw biomass, after being crushed, it is mixed and granulated with sludge, and is pyrolytic charred by programmed heating, to obtain bulk loaded zero-valent iron biochar and sludge biochar composite particles, which are packed as fillers in a filled bed or as filters in filter cells of a fixed bed, for effective recovery of complex polluted water, polluted by heavy metals, organics, nitrogen, phosphorus, and the like, thereby completing the present invention.

The object of the present invention is to provide the following aspects:

According to a first aspect of the invention, it provides a composite treatment and recovery technique or process of polluted water body and soil, comprising:

passing the polluted water through a filled bed or a filter cell of a fixed bed, filled with bulk loaded zero-valent iron biochar and sludge biochar composite particles.

According to a second aspect of the invention, there is provided said composite treatment and recovery technique or process, wherein the bulk-loaded zero-valent iron biochar and sludge biochar composite particles are obtained by mixing iron-rich biomass crush with sludge, and granulating, followed by programmed heating and pyrolysis charring under nitrogen atmosphere.

Wherein the iron-rich biomass is rice straw, in particular rice straw grown in acidic red soil.

According to a third aspect of the present invention, there is provided said composite treatment and recovery technique or process, said programmed heating comprising three stages:

First heating stage: heating to 300° C. at a rate of 5-10° C./min. and maintaining at this temperature for 30-40 minutes;

Second heating stage: heating from 300° C. to 480° C. at a rate of 5-8° C./min. and maintaining at this temperature for 15-35 minutes;

Third heating stage: heating from 480° C. to 600-850° C. at a rate of 5-8° C./min. and maintaining at this temperature for 12-20 minutes.

According to a fourth aspect of the present invention, there is provided said composite treatment and recovery technique or process, wherein, during the first heating stage, heating at a rate of 7-10° C./min., preferably 8° C./min., and maintaining the temperature for 30-35 minutes, preferably 30 minutes after heating to 300° C.

During the second heating stage, heating at a rate of 6-8° C./min., preferably 6° C./min., and maintaining the temperature for 20-30 minutes, preferably 20 minutes after heating to 480° C.

During the third heating stage, heating at a rate of 5-6° C./min., preferably 5° C./min., and maintaining the temperature for 15-20 minutes, preferably 20 minutes after heating to 600-850° C.

According to a fifth aspect of the present invention, there is provided said composite treatment and recovery technique or process, wherein the sludge is dewatered to a water content of 50-70%, preferably 55-65%.

According to a sixth aspect of the present invention, there is provided said composite treatment and recovery technique or process, wherein iron salts are added to the dewatered sludge, mixed and sit down for a period of time.

According to a seventh aspect of the present invention, there is provided said composite treatment and recovery technique or process, wherein mineral earth, such as bentonite or kaolin is also added and pelletized.

According to an eighth aspect of the present invention, there is provided said composite treatment and recovery technique or process, wherein said bulk loaded zero-valent iron biochar and sludge biochar compo site particles have a biofilm suspended thereon.

According to a ninth aspect of the present invention, there is provided said composite treatment and recovery technique or process, wherein the filled bed or the filter cell of the fixed bed is further filled with other porous filter material, which preferably having a biofilm suspended thereon.

According to a tenth aspect of the present invention, there is provided said composite treatment and recovery technique or process, wherein the polluted soil is embedded with the bulk loaded zero-valent iron biochar and sludge biochar composite particles.

The composite treatment and recovery technique(s) of polluted water body and soil provided by the present invention have the following advantages:

(1) Iron-rich straw biomass is used as plant biochar feedstock, with zero-valent iron loaded in situ in the biomass. The content of iron is significantly increased for the reason that iron in the biomass is not lost to waste.

(2) In the bulk loaded zero-valent iron biochar and sludge biochar composite particles employed in the present invention, the zero-valent iron is stably loaded in the bulk loaded zero-valent iron biochar. The zero-valent iron particles are unagglomerated, and are dispersed and loaded in embedded form with long lasting action.

(3) The bulk loaded zero-valent iron biochar and sludge biochar composite particles formed from iron rich biochar and sludge according to the present invention, have high adsorption because of high porosity and specific surface area. The biochar particles are obtained by exploiting the stickiness and minerality of sludge, and have improved reliability and durability while they are used as recovery materials.

(4) In the present invention, the specific surface area and porosity of the bulk loaded zero-valent iron biochar and sludge biochar composite particles formed from the iron rich biochar and sludge are greatly enhanced with appropriate temperature programming under nitrogen atmosphere, thus the adsorption properties are greatly enhanced, and an extremely large effective contact area and reaction space are provided for the loaded zero-valent iron therein.

(5) The bulk-loaded zero-valent iron biochar and sludge biochar composite particles formed from iron-rich biochar and sludge are directly charred at relatively high temperatures and easily produced.

(6) The recovery and treatment of polluted water using the bulk loaded zero-valent iron biochar and sludge biochar composite particles is remarkably effective in removing not only heavy metal ions and organics, but also nitrogen and phosphorus from the sewage.

DETAILED DESCRIPTION OF INVENTION

Figure 1:
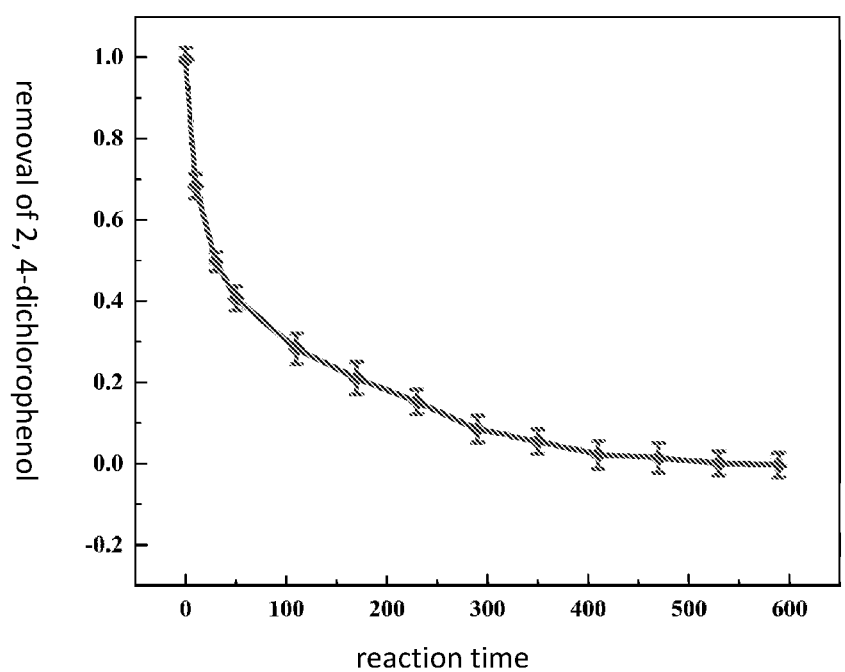
FIG. 1 shows the removal profile of 2,4-dichlorophenol in Example 4.

The present invention will be described in more detail through preferred embodiments and examples. Through these descriptions, the features and advantages of the present invention will become clearer.

The term "exemplary" as used herein is intended to be "serving as an example, an illustrative embodiment, or an embodiment". Any of the embodiment(s) described herein as "exemplary" need not be construed as preferred as or better than other embodiment(s). Although various aspects of the examples are shown in the figures, the figures are not necessarily drawn to scale, unless specifically noted.

In the present invention, crop stalks, such as rice stalks, grown in iron-rich red soil are preferably employed as iron-rich plants. In the acidic red soil, the ferric ions are high in content, absorbed by rice and transported to the tissues of various organs such as roots, stems and leaves, accumulating long-term through the growth cycle, thereafter ferric/ferrous ions are enriched in crop plants, reacting in situ in pyrolytic charring, and the zero-valent iron formed is loaded in situ in the biochar.

The inventors found that rice has a good enrichment effect for iron, particularly when planted in iron-rich red soil. Rice is harvested as a food product, thereafter the remaining straw (including rice roots and rice stalks, etc.), one of agricultural wastes, is just usefully utilized as feedstock for the present invention.

In an alternative embodiment of the present invention, rice can also be grown in non-red loamy iron-poor soils, such as black soil. However, in order to ensure the enrichment effect of iron in rice, iron fertilizers, such as ferrous sulfate or ferric sulfate, preferably ferrous ions or ferric ions in a concentration in the range of 50-800 mg/L, more preferably in the range of 200-600 mg/L, further preferably in the range of 350-550 mg/L, most preferably in the range of 400-500 mg/L, are applied in rice paddy. If the concentration of ferric/ferrous ion is too low, the final obtained zero-valent iron loaded biochar material will have a limited increase in specific surface area and porosity, meanwhile the zero-valent iron loading is not high and is difficult to use stably over a long period of time. If the concentration of ferric/ferrous ion is too high, there is no significant improving effect on the enrichment of iron in rice, and it tends to render the rice less susceptible to farming.

In practice, the rice planting cycle is as long as possible to ensure an iron enrichment effect. The inventors have found that a planting cycle of 3 months or more is necessary to ensure an iron enrichment effect, and that a planting cycle of 4 months or more is more advantageous.

The inventors have found that, the application of an aqueous citric acid solution as a root nutrient agent helps to increase the further enrichment of iron in the biomass when growing rice. Preferably, the concentration of aqueous citric acid is not higher than 1 g/L, more preferably not higher than 500 mg/L, further preferably in the range of 185-450 mg/L, most preferably in the range of 200-400 mg/L.

In the present invention, as iron-rich biomass, the whole of rice straw may be used. The inventors have found that, the roots of rice have higher iron load after pyrolysis relative to the stems and the leaves of rice, and are therefore more preferred.

The iron-rich biomass needs to be dried, crushed before the pyrolytic carbonization is performed. The size of the crushed particles is not particularly limited, but is preferably 2 mm or less, more preferably 1 mm or less, and still more preferably 0.4 mm or less.

In the present invention, in addition to iron-rich plant biochar, mineral biochar sludge is used. After being crushed, iron-rich plants are mixed with the sludge, followed by dewatering and pelletizing to give granules, which are dried and charred without oxygen, to obtain bulk-loaded zero-valent iron biochar and sludge biochar composite granules or particles.

As the sludge, household sewage sludge, industrial sewage sludge, feedwater sludge, and the like may be used without particular limitation. Use after dewatering of the sludge, there is no limitation as to the manner of dewatering, and common means, such as mechanical means, for example plate and frame squeeze dewatering, can be employed.

Preferably, the sludge is dewatered to a water content of 50-70%, more preferably 55-65%.

In a preferred embodiment of the present invention, iron salts, such as $FeSO_4$, are added to the dewatered sludge and mixed well, left for a period of time, such as around a week, and then mixed with iron-rich plant powders, to further increase the content of zero-valent iron in the resulting granules and reduce the content of heavy metal ion in the granules.

In the present invention, the iron-rich plant powder is used in an amount of 30-200 parts by volume, preferably 50-150 parts by volume, more preferably 100-150 parts by volume, based on 100 parts by volume of dewatered sludge. In this dosage range, the resulting iron rich biochar and sludge formed bulk loaded zero-valent iron biochar and sludge biochar composite particles have excellent recovery capacity and strength.

In another preferred embodiment, mineral earth, such as bentonite or kaolin is also added to reduce the difficulty of granulation and enhance the strength of the resulting granules. Mineral earth, such as bentonite or kaolin, is added in an amount of 5-20 parts by volume, preferably 10-15 parts by volume, based on 100 parts by volume of the dewatered sludge.

The dewatered sludge is mixed with iron-rich plant powder and even mineral earths, such as bentonite or kaolin, and granulated or pelletized. For granulation, there is no particular requirement, and common granulation methods can be used.

For ease of use in subsequent recovery, it is preferred that the particles have a size of 1-10 mm, more preferably 1-5 mm, still more preferably 1-3 mm.

High temperature pyrolytic charring of the particles after drying under oxygen barrier conditions, such as nitrogen atmosphere, results in bulk loaded zero-valent iron biochar and sludge biochar composite particles.

The inventors found that, after being pyrolytic charred or carbonized in three stages, the iron-rich biomass can be charred to give a stable bulk loaded zero-valent ferrous biochar material with higher specific surface area and porosity, likewise contributing to the pyrolytic charring of particles of dewatered sludge with ferrous plant powders and even mineral earth, resulting in composite particles with good quality.

In the first temperature rising stage, the temperature rising is performed at a heating rate of 5-10° C./min., preferably at a rate of 7-10° C./min., preferably at a rate of 8° C./min., the temperature is raised to 300° C., and held at this temperature for 30-40 minutes, preferably 30-35 minutes, more preferably 30 minutes.

In the first temperature rising phase, the specific surface area of the resultant bulk loaded zero-valent iron biochar and sludge biochar composite particles will be not high if the heating rate is too fast or the holding temperature time is too short; meanwhile, the long-term stability applicability of the resultant bulk loaded zero-valent iron biochar and sludge biochar composite particles will deteriorate if the heating rate is too slow or the holding temperature time is too long.

In the second temperature rising stage, the temperature rising is performed at a heating rate of 5-8° C./min., preferably at a rate of 6-8° C./min., more preferably at a rate of 6° C./min., from 300° C. to 480° C., and held at this temperature for 15-35 minutes, preferably for 20-30 minutes, more preferably for 20 minutes.

In the second heating stage, if the heating rate is too fast or too slow, the specific surface area and long-term application stability of the resulting bulk-loaded zero-valent iron biochar and sludge biochar composite particles will be affected. Holding or maintaining reaction times in the above ranges also help ensure that bulk loaded zero-valent iron biochar and sludge biochar composite particles have desirable large specific surface area and long-term stable applicability.

In the third temperature increase stage, the temperature increase is performed at a heating rate of 5-8° C./min., preferably 5-6° C./min., more preferably 5° C./min., the temperature increase is performed from 480° C. to 600-850° C., preferably 700-800° C., and held at this temperature for 12-20 minutes, preferably 15-20 minutes, more preferably 20 minutes.

In the third heating stage, if the heating rate is too fast or too slow, the specific surface area and long term application stability of the resulting bulk loaded zero-valent iron biochar and sludge biochar composite particles will be affected. If the reaction temperature is maintained below 600° C., the content of zero-valent iron in the resulting material will be relatively low; if the reaction temperature is maintained above 850° C., the reactivity of the resulting bulk supported zero-valent iron biochar and sludge biochar composite particles will be somewhat affected. Reaction times within the above ranges also help ensure that the zero-valent iron-loaded biochar material has a desirably large specific surface area, good activity and long-term stable applicability.

In the present invention, uniform buried application of the above bulk loaded zero-valent iron biochar and sludge biochar composite particles in polluted soil can remediate heavy metal pollution, organic pollution and the like of soil. The bulk loaded zero-valent iron biochar and sludge biochar composite particles may exert a recovery and treatment effect on polluted soil over a long period of time.

In the present invention, the bulk loaded zero-valent iron biochar and sludge biochar composite particulate material is applied in polluted soil in an amount of, for example, 100-1500 mg/kg, preferably 200-500 mg/kg, more preferably 200-400 mg/kg.

EXAMPLES

The present invention is further described below by way of specific examples, which, however, are merely illustrative and do not constitute any limitation on the scope of protection of the present invention.

Example 1

Rice was grown in red soil for 100 days with 300 mg/L citric acid aqueous solution sprayed weekly. After 100 days, the rice was extracted from the soil, the paddies were removed, and the straws were remained. The straws were washed with deionized water, immersed in 0.01 M diluted hydrochloric acid for 1 hour, and the straws were divided into roots and stalks, dried at 70.0° C., and crushed into 1 mm particles.

Example 2

The particles from roots obtained in Example 1 were subjected to pyrolytic carbonization in a tubular muffle furnace charged with nitrogen, programmed heating with the following steps:
 (1) first heating stage: heating to 300° C. at a rate of 8° C./min., and maintaining the reaction for 30 minutes;
 (2) second heating stage: heating from 300° C. to 480° C. at a rate of 6° C./min., and maintaining the reaction for 20 minutes;
 (3) third heating stage: heating from 480° C. to 750° C. at a rate of 5° C./min., and maintaining the reaction for 20 minutes.

A zero-valent iron loaded biochar material was obtained. Its XRD pattern has the following 2θ:44.8°, which is characteristic peak of zero valence iron; 35.3°, which is characteristic peak of $Fe_3O_4$. The specific surface area was 213.6 m²/g. XPS showed the content of zero-valent iron of 1.39%, 9.05% and 18.41% at the surface, 40 nm depth and 80 nm depth, respectively.

Example 3

In a 200 ml Erlenmeyer flask, 20 mg of the zero-valent iron loaded biochar material obtained in Example 2, 100 ml of 2,4-dichlorophenol solution with a concentration of 50.00 mg/L, and 5 ml of potassium persulfate solution with a concentration of 2 g/L were added and stirred well. After 590 minutes of reaction, the concentration of 2,4-dichlorophenol in the solution was measured, its removal was calculated, and the removal curve was plotted. This was performed 5 times, averaged, and the results are shown in FIG. 1.

As can be seen from FIG. 1, the removal of 2,4-dichlorophenol with high concentration by the zero-valent iron loaded biochar material obtained in Example 2 was very fast and very efficient. The removal of 2,4-dichlorophenol already reaching more than 98% after reacting 400 minutes, and reaching 99.02% after reacting 590 minutes.

Example 4

Rice was grown in red soil for 100 days with 300 mg/L citric acid aqueous solution sprayed weekly. After 100 days, the rice was extracted from the soil, the paddies were removed, and the straws were left behind, dried in air, and crushed until ready for use.

Municipal sludge was dewatered to water content of around 60%, and was added with 1 wt. % ferrous sulfate, aged for 7 days, and then was added with the above iron-rich rice straw powder in a ratio of 1:1 volume, and with bentonite in a ratio of 1:0.15 volume, thereafter was mixed well and was made into 2 mm granules, and finally was dried.

In a tubular muffle furnace, nitrogen was charged, and the dry particles were subjected to pyrolytic carbonization with the following programmed heating to obtain bulk supported zero-valent iron biochar and sludge biochar composite particles:

(1) first heating stage: heating to 300° C. at a rate of 8° C./min., and maintaining the reaction for 30 minutes;
(2) second heating stage: heating from 300° C. to 480° C. at a rate of 6° C./min., and maintaining the reaction for 20 minutes;
(3) third heating stage: heating from 480° C. to 750° C. at a rate of 5° C./min., and maintaining the reaction for 20 minutes.

Example 5

Figure 2:
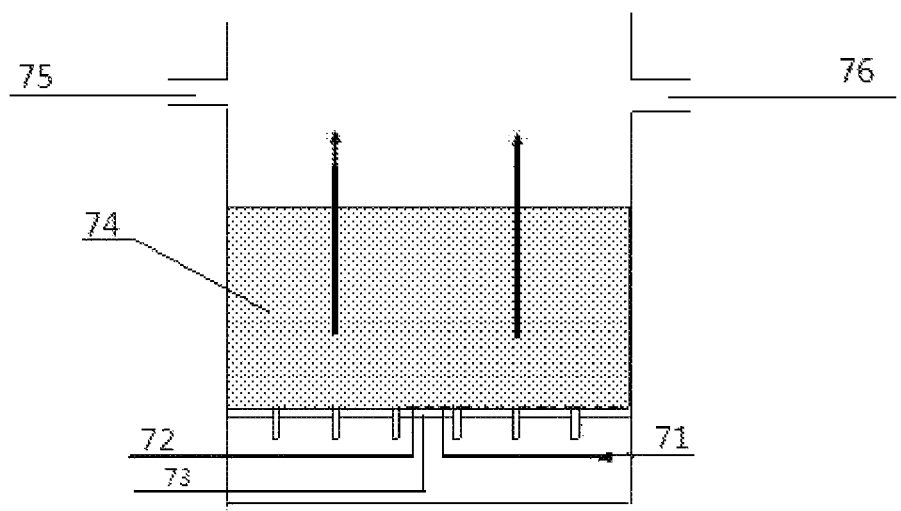
FIG. 2 shows a schematic view of a filter cell of a fixed bed in a preferred embodiment of the present invention.
71—water inlet
72—backwash water inlet
73—backwash gas inlet
74—filler
75—water outlet
76—backwash water outlet

As shown in FIG. 2, a filter cell of a fixed bed was constructed, which is filled with bulk loaded zero-valent iron biochar and sludge biochar composite particles obtained in Example 4. Polluted water was pumped into the water inlet, and was discharged after purifying from the water outlet.

Sewage plant activated sludge was taken and injected into the filter cell for 72 hours, and then the pump was turned on to pump into the wastewater to be treated through the water inlet for a reaction time of 1.5 hours, until total nitrogen and total phosphorus in the outlet water were substantially stable.

The wastewater to be treated was detected to have total Pb content of 4.5 mg/L, COD of 312 mg/L, total P content of 5.05 mg/L and total N content of 55.3 mg/L. The water outlet was sampled every 24 hours for 12 consecutive days and the contents of pollutants were detected and averaged, the results show total Pb content of 0.11 mg/L, COD of 49 mg/L, total P content of 0.64 mg/L and total N content of 13.9 mg/L.

Example 6

As shown in FIG. 2, a filter cell of a fixed bed was constructed, which is filled with bulk loaded zero-valent iron biochar and sludge biochar composite particles obtained in Example 4 for 60%, and is filled with zeolite particles for 40%. Polluted water was pumped in through the water inlet and was discharged after purifying from the water outlet.

Sewage plant activated sludge was taken and injected into the filter cell for 72 hours, and then the pump was turned on to pump into the wastewater to be treated through the water inlet for a reaction time of 1 hour, until the total nitrogen and total phosphorus in the outlet water were substantially stable.

The wastewater to be treated was detected to have total Pb content of 4.5 mg/L, COD of 312 mg/L, total P content of 5.05 mg/L and total N content of 55.3 mg/L. The water outlet was sampled every 24 hours for 12 consecutive days and the contents of pollutants were detected and averaged, the results show total Pb content of 0.1 mg/L, COD of 47 mg/L, total P content of 0.57 mg/L and total N content of 12.1 mg/L.

The present invention has been described in detail with reference to specific embodiments and exemplary examples, but these descriptions should not be construed as limiting the present invention. Those skilled in the art should understand that, without departing from the spirit and scope of the present invention, various equivalent replacements, modifications, or improvements can be made to the technical solution and its implementation of the present invention, all of which fall within the scope of the present invention.

What is claimed is:

1. A process comprising:
    passing polluted water through either a) a filled bed of bulk loaded composite particles or through b) a filter cell of a fixed bed of bulk loaded composite particles to yield decontaminated water; heavy metal ions and organics being retained in the composite particles;
    wherein each composite particle comprises zero-valent iron biochar and sludge biochar.
2. The process according to claim 1,
    wherein the bulk loaded zero-valent iron biochar and sludge biochar composite particles are obtained by mixing crushed iron-rich biomass with sludge, and granulating, followed by programmed heating and pyrolytic charring under nitrogen atmosphere,
    wherein the iron-rich biomass is rice straw grown in acidic red soil.
3. The process according to claim 1, said programmed heating comprising three stages:
    first heating stage: heating to 300° C. at a rate of 5-10° C./min and maintaining at this temperature for 30-40 minutes;
    second heating stage: heating from 300° C. to 480° C. at a rate of 5-8° C./min and maintaining at this temperature for 15-35 minutes;
    third heating stage: heating from 480° C. to 600-850° C. at a rate of 5-8° C./min and maintaining at this temperature for 12-20 minutes.

4. The process according to claim 3, wherein,
during the first heating stage, heating at a rate of 7-10° C./min and maintaining the temperature for 30-35 min after heating to 300° C.;
during the second heating stage, heating at a rate of 6-8° C./min, and maintaining the temperature for 20-30 min after heating to 480° C.;
during the third heating stage, heating at a rate of 5-6° C./min, and maintaining the temperature for 15-20 min after heating to 600-850° C.

5. The process according to claim 1, wherein the sludge biochar is dewatered to a water content of 50-70%.

6. The process according to claim 1, wherein iron salts and dewatered sludge are mixed and the resulting mixture settles for a period of time.

7. The process according to claim 1, wherein the composite particles further comprise mineral earth and the composite particles are granulated before the passing step.

8. The process according to claim 1, wherein said bulk loaded zero-valent iron biochar and sludge biochar composite particles have a biofilm suspended thereon.

9. The process according to claim 1, wherein the filled bed or the filter cell of the fixed bed is further mixed with porous filter material.

10. The process according to claim 4, wherein,
during the first heating stage, heating at a rate of 8° C./min, and maintaining the temperature for 30 minutes after heating to 300° C.;
during the second heating stage, heating at a rate of 6° C./min, and maintaining the temperature for 20 minutes after heating to 480° C.;
during the third heating stage, heating at a rate of 5° C./min, and maintaining the temperature for 20 minutes after heating to 600-850° C.

11. The process according to claim 5, wherein the sludge biochar is dewatered to a water content of 55-65%.

12. The process according to claim 7, wherein the mineral earth is bentonite or kaolin.

13. The process according to claim 9, wherein the porous filter material has a biofilm suspended thereon.

* * * * *